United States Patent
Boss et al.

(10) Patent No.: US 10,360,546 B2
(45) Date of Patent: *Jul. 23, 2019

(54) METHOD FOR SUPPLYING ELECTRICAL POWER AND BILLING FOR ELECTRICAL POWER SUPPLIED USING FREQUENCY REGULATION CREDITS

(71) Applicant: International Business Machines Corporation, Armonk, NY (US)

(72) Inventors: Gregory J. Boss, Saginaw, MI (US); Rick A. Hamilton, II, Charlottesville, VA (US); Julianne F. Haugh, Austin, TX (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 194 days.

This patent is subject to a terminal disclaimer.

(21) Appl. No.: 14/032,246

(22) Filed: Sep. 20, 2013

(65) Prior Publication Data

US 2014/0025547 A1 Jan. 23, 2014

Related U.S. Application Data

(63) Continuation of application No. 13/410,536, filed on Mar. 2, 2012, now Pat. No. 8,554,387, which is a
(Continued)

(51) Int. Cl.
*G06Q 20/14* (2012.01)
*G06Q 10/06* (2012.01)
(Continued)

(52) U.S. Cl.
CPC .......... *G06Q 20/145* (2013.01); *G06Q 10/06* (2013.01); *G06Q 30/018* (2013.01); *G06Q 30/04* (2013.01);
(Continued)

(58) Field of Classification Search
CPC ...... G06Q 30/04; G06Q 10/06; G06Q 30/018; G06Q 50/06; G06Q 20/145; H02J 3/14;
(Continued)

(56) References Cited

U.S. PATENT DOCUMENTS 6,167,389 A 12/2000 Davis et al.
7,149,605 B2 12/2006 Chassin et al.
(Continued)

FOREIGN PATENT DOCUMENTS

EP 1271740 1/2003
EP 1467463 10/2004
(Continued)

OTHER PUBLICATIONS

International Search Report for PCT/EP2010/066918 dated Apr. 20, 2011.
(Continued)

*Primary Examiner* — Igor N Borissov
(74) *Attorney, Agent, or Firm* — Schmeiser, Olsen & Watts, LLP; Michael Petrocelli

(57) ABSTRACT

A method supplying AC power and billing a customer using frequency regulation credits. The method includes using an AC frequency measuring device, measuring a current AC frequency on an AC power line; using a power consumption measuring device, measuring a current power consumption on the AC power line over a period of time equal to a sampling interval; calculating a power consumption moving average of a last N power current power consumptions measured, where N is a positive integer greater than 1; generating credits or debits based on the current power consumption, the current AC frequency and the power consumption moving average; adding the credits or debits to a frequency regulation credit; and for each next sampling interval repeating measuring the current AC frequency,
(Continued)

measuring current power consumption, calculating the power consumption moving average, generating the credits or debits, and adding the credits or debits to the frequency regulation credit.

7 Claims, 6 Drawing Sheets

Related U.S. Application Data continuation of application No. 12/623,732, filed on Nov. 23, 2009, now Pat. No. 8,249,756.

(51) Int. Cl.
*G06Q 30/00* (2012.01)
*G06Q 50/06* (2012.01)
*H02J 3/14* (2006.01)
*G06Q 30/04* (2012.01)

(52) U.S. Cl.
CPC ............. *G06Q 50/06* (2013.01); *H02J 3/14* (2013.01); *H02J 2003/146* (2013.01); *Y02B 70/3225* (2013.01); *Y04S 20/222* (2013.01); *Y04S 20/224* (2013.01); *Y04S 50/12* (2013.01)

(58) Field of Classification Search
CPC ............ H02J 2003/146; Y02B 70/3225; Y04S 20/222; Y04S 20/224
USPC ........... 705/34, 39, 400, 412, 7.11, 37, 14.1, 705/14.11, 14.15, 14.17, 14.23, 14.25, 705/14.34, 14.36, 14.38, 14.39, 1.1; 700/286, 291, 293, 295, 297, 298; 307/34, 35, 39, 129
See application file for complete search history.

(56) References Cited

U.S. PATENT DOCUMENTS

| | | |
|---|---|---|
| 7,349,815 B2 | 3/2008 | Bickel et al. |
| 7,356,385 B2 | 4/2008 | Lenarduzzi et al. |
| 7,490,013 B2 | 2/2009 | Wells et al. |
| 8,249,756 B2 | 8/2012 | Boss et al. |
| 8,554,387 B2 | 10/2013 | Boss et al. |
| 2007/0198133 A1 | 8/2007 | Hirst |
| 2007/0213878 A1 | 9/2007 | Chen et al. |
| 2007/0220907 A1 | 9/2007 | Ehlers |
| 2010/0072817 A1 | 3/2010 | Hirst |
| 2010/0076835 A1 | 3/2010 | Silverman |
| 2010/0218006 A1 | 8/2010 | Boss et al. |
| 2011/0125657 A1 | 5/2011 | Boss et al. |
| 2012/0179631 A1 | 7/2012 | Boss et al. |

FOREIGN PATENT DOCUMENTS

| | | |
|---|---|---|
| GB | 2426878 | 12/2006 |
| GB | 2442760 | 4/2008 |
| JP | 2008067544 | 3/2008 |
| WO | 9735374 | 9/1997 |
| WO | 2005029670 | 3/2005 |

OTHER PUBLICATIONS

Office Action (dated Dec. 15, 2011) for U.S. Appl. No. 12/623,732, filed Nov. 23, 2009; Confirmation No. 6955.
Amendment filed Mar. 2, 2012 in response to Office Action (dated Dec. 15, 2011) for U.S. Appl. No. 12/623,732, filed Nov. 23, 2009; Confirmation No. 6955.
Notice of Allowance (dated Dec. 15, 2011) for U.S. Appl. No. 12/623,732, filed Nov. 23, 2009; Confirmation No. 6955.
Definition of Universal Computer; Wikipedia (German); retrieved from the Internet May 15, 2013; URL: http://de.wikipedia.org/w/index.php?title+Universalrechner&oldid=35707506; 1 page.
Office Action (dated Jul. 25, 2012) for U.S. Appl. No. 13/410,536, filed Mar. 2, 2012; Confirmation No. 1064.
Amendment filed Oct. 9, 2012 in response to Office Action (dated Jul. 25, 2012) for U.S. Appl. No. 13/410,536, filed Mar. 2, 2012; Confirmation No. 1064.
Office Action (dated Nov. 19, 2012) for U.S. Appl. No. 13/410,536, filed Mar. 2, 2012; Confirmation No. 1064.
Amendment filed Feb. 17, 2013 in response to Office Action (dated Nov. 19, 2012) for U.S. Appl. No. 13/410,536, filed Mar. 2, 2012; Confirmation No. 1064.
Final Office Action (dated Mar. 26, 2013) for U.S. Appl. No. 13/410,536, filed Mar. 2, 2012; Confirmation No. 1064.
Amendment After Final filed May 16, 2013 in response to Final Office Action (dated Mar. 26, 2013) for U.S. Appl. No. 13/410,536, filed Mar. 2, 2012; Confirmation No. 1064.
Notice of Allowance (dated May 30, 2013) for U.S. Appl. No. 13/410,536, filed May 2, 2012; Confirmation No. 1064.
Examination Report under Section 18(3); Intellectual Property Office—United Kingdom; Application No. GB12040051; dated Jan. 18, 2016; 6 pages.

METHOD FOR SUPPLYING ELECTRICAL POWER AND BILLING FOR ELECTRICAL POWER SUPPLIED USING FREQUENCY REGULATION CREDITS

RELATED APPLICATIONS

This application is a continuation of U.S. patent application Ser. No. 13/410,536 filed Mar. 2, 2012, now U.S. Pat. No. 8,554,387 issued Oct. 8, 2013, which is a continuation of U.S. patent application Ser. No. 12/623,732 filed on Nov. 23, 2009 now U.S. Pat. No. 8,249,756 issued Aug. 21, 2012.

FIELD OF THE INVENTION

The present invention relates to the field of AC power grid load management; more specifically, it relates to a method and device for frequency responsive load management using frequency regulation credits.

BACKGROUND

Currently, electric power providers must constantly add and remove power generation capacity to match real-time demand. This power supply/demand balancing requires bringing on and off line auxiliary generating facilities. This process not only increases the costs of generating power, but provides little incentive for power conservation. Accordingly, there exists a need in the art to mitigate the deficiencies and limitations described herein above.

SUMMARY

A first aspect of the present invention is a method, comprising: using an AC frequency measuring device, measuring a current AC frequency on an AC power line; using a power consumption measuring device, measuring a current power consumption on the AC power line over a period of time equal to a sampling interval; calculating a power consumption moving average of a last N power current power consumptions measured, where N is a positive integer greater than 1; generating credits or debits based on the current power consumption, the current AC frequency and the power consumption moving average; adding the credits or debits to a frequency regulation credit; and for each next sampling interval repeating the measuring the current AC frequency, the measuring the current power consumption, the calculating the power consumption moving average, the generating the credits or debits, and the adding the credits or debits to the frequency regulation credit.

A second aspect of the present invention is a device, comprising: an AC frequency measuring device; an AC power measuring device; means for generating a frequency regulation credit based on signals from the AC frequency measuring device and the AC power measuring device, the means for generating the frequency regulation credit connected to the AC frequency measuring device and to the AC power measuring device; and means for displaying, recording or both displaying and recording the frequency regulation credit.

A third aspect of the present invention is a computer system comprising a processor, an address/data bus coupled to the processor, and a computer-readable memory unit coupled to communicate with the processor, the memory unit containing instructions that when executed by the processor implement a method for frequency responsive load management using frequency regulation credits, the method comprising the computer implemented steps of: receiving from an AC frequency measuring device, a current AC frequency on an AC power line; receiving from a power consumption measuring device, a current power consumption on the AC power line over a period of time equal to a sampling interval; calculating a power consumption moving average of a last N power current power consumptions measured, where N is a positive integer greater than 1; generating credits or debits based on the current power consumption, the current AC frequency and the power consumption moving average; adding the credits or debits to a frequency regulation credit, storing the frequency regulation credit on the memory unit; and for each next sampling interval repeating the steps of receiving from the AC frequency measuring device the current AC frequency on an AC power line, receiving from the power consumption measuring device the current power consumption, calculating the power consumption moving average, generating the credits or debits adding the credits or debits to the frequency regulation credit, and storing the frequency regulation credit on the memory unit.

These and other aspects of the invention are described below.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION

The direction of alternating electric current (AC) periodically changes and results in a sinusoidal change of voltage from a maximum positive value to a minimum negative value over time. Thus, the frequency of AC power can be defined on a plot of voltage versus angular frequency the number of angular frequency cycles (0 to 360 degrees) per unit of time and the usual unit of measurement is Hertz, also commonly cycles/second, often shorted to cycles. AC power grids are designed to run most efficiently at a nominal frequency. In one example, the nominal frequency of an AC power grid is 60 Hz. In one example, the nominal frequency of an AC power grid is 50 Hz. The AC power grids of interest in the present invention are those bulk electrical transfer networks and sub-networks for transferring electricity from commercial power generating stations to consumers, such as households, businesses and factories. In one example, an AC power grid comprises a main power plant, an optional auxiliary power plant, and transmission lines.

As power demand (e.g., power consumption or load) increases on an AC power grid, the frequency decreases. In order to increase the frequency, either an increase in power generation or decrease in demand is required. Power generation can be increased by running main plants at higher output or bringing auxiliary power plants on line. Increasing the output of main power plants increases the maintenance costs and decreases the life of the plant, resulting in increased costs. Bringing auxiliary power plants online increase costs because auxiliary power plants often use fuels that are more expensive and/or are less efficient and thus more costly per unit of energy generated. As power demand decreases on an AC power grid, the frequency increases. In order to decrease the frequency, either a decrease in power generation or increase in demand is required. The methods and systems of the present invention monitor a customer's usage of power as the AC line frequency on a power grid supplying power to the consumer changes. The customer is penalized for using more power during a period of low AC line frequency or for using less power during a period of high AC line frequency grid thus providing incentive for the consumer to assist in maintaining the AC line frequency of the power grid at or close to nominal. Thus the customer is rewarded for increasing stability in the AC line frequency and penalized for decreasing stability in the AC line frequency. The rewards are in the form of frequency regulation credits and frequency regulation debits that, in one example, will increase (if frequency regulation debits exceed frequency regulation credits) or decrease (if frequency regulation credits exceed frequency regulation debits) a customer's bill. In another example, the frequency regulation debits and frequency regulation credits may be used to adjust a customer's electric rate (e.g., cost per KW/hour).

Figure 1:
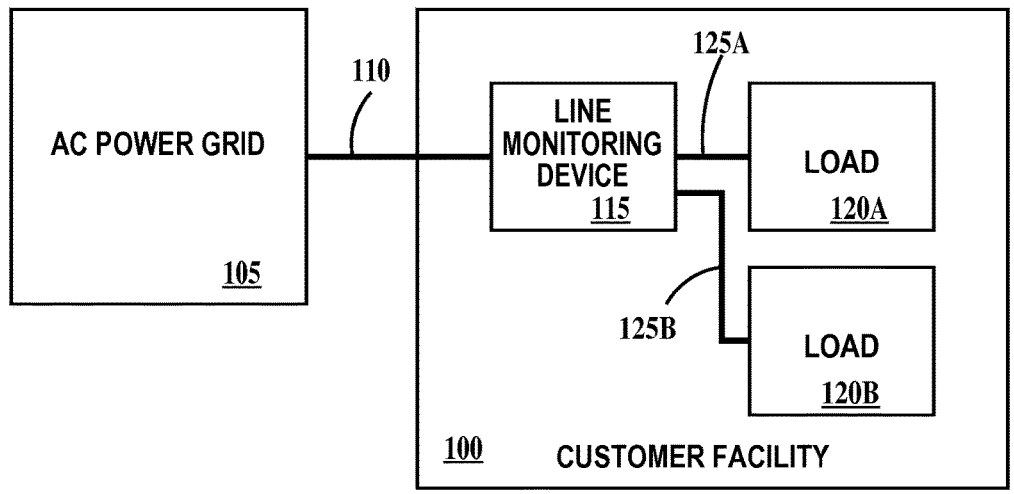
FIG. 1 a diagram illustrating an exemplary customer facility linked to a power grid according to an embodiment of the present invention.

FIG. 1 a diagram illustrating an exemplary customer facility linked to a power grid according to an embodiment of the present invention. In FIG. 1, a customer facility 100 is connected to an AC power grid 105 by a power line 110. Customer facility 100 includes a line monitoring device 115, and two exemplary loads 120A and 120B. AC power passes through load monitoring device to loads 120A and 120B through wires 125A and 125B respectively. Examples of customer facilities include private residences, commercial and industrial facilities. Loads may be direct connections to equipment that use AC power or to a distribution device (e.g., a circuit breaker box or a load center). While two loads are illustrated in FIG. 1, there may be as few as one load or more than two loads.

Figure 2:
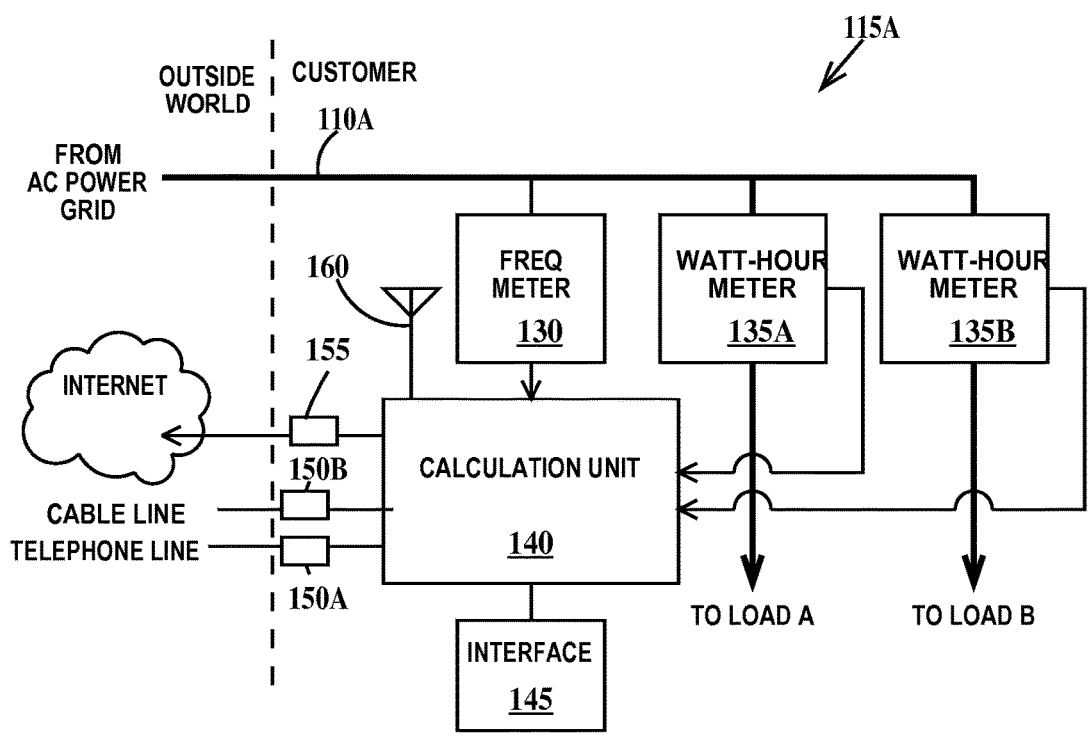
FIG. 2 is a diagram of illustrating the major components of a line monitoring device according to embodiments of the present invention.

FIG. 2 is a diagram illustrating the major components of a line monitoring device according to embodiments of the present invention. In FIG. 2, line monitoring device 115A includes a frequency meter 130, watt-hour meters 135A and 135B, a calculation unit 140, an optional human interface 145 an optional telephone connection (e.g., modem) 150A, an optional cable (i.e., non-telephone communications) modem 150B, an optional Internet connection 155 which may be wired or wireless and an optional private wireless communication device (e.g., wireless modem) 160. Power from an AC power grid passes along wire 110A through watt meters 135A and 135B to respective loads A and B. Watt meters 135A and 135B measure the amount of power (e.g., watt-hours) being consumed and passes that information to calculation unit 140. Frequency meter 130 measures the AC line frequency (e.g. Hz or cycles/second) on wire 110A and passes that information to calculation unit 140. The power and frequency measurements may be passed to calculation unit 140 as analog or digital signals. If digital, the information is in the form of a periodic sample.

Figure 3:
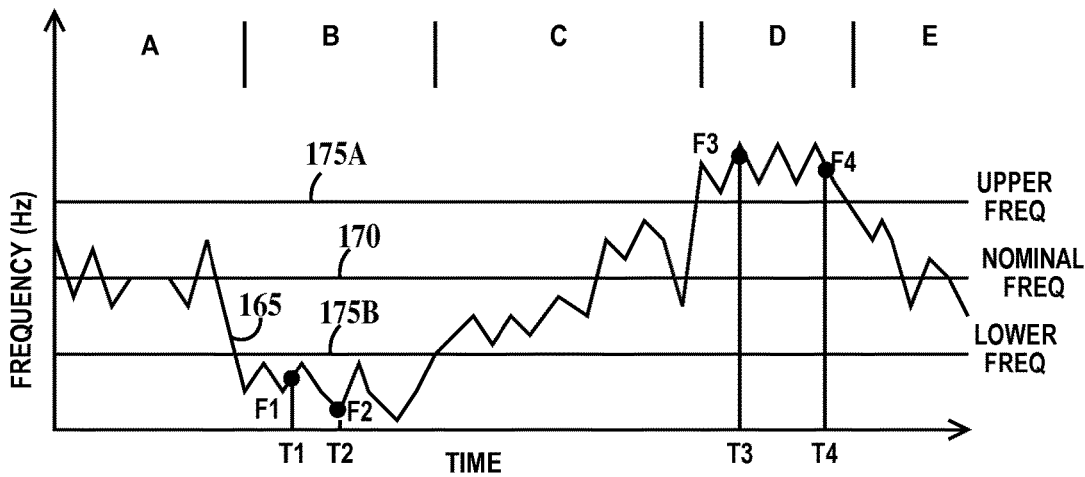
FIG. 3 is an exemplary plot of AC line frequency versus time measured by a line monitoring device according to an embodiment of the present invention.
Figure 4:
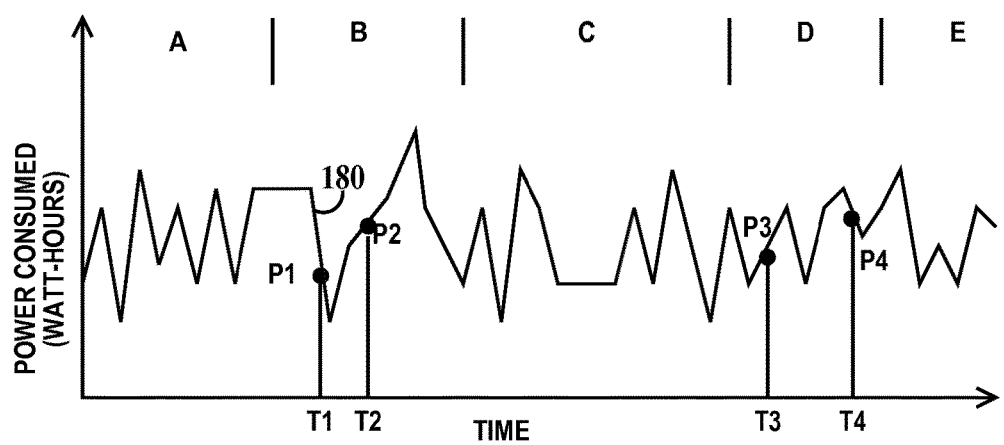
FIG. 4 is an exemplary plot of power consumption versus time measured by a load management device according to an embodiment of the present invention.
Figure 5:
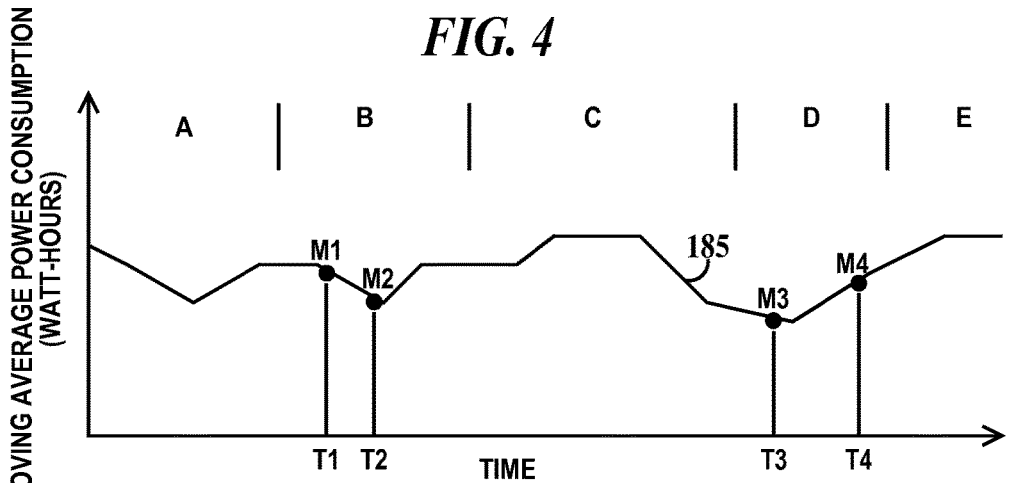
FIG. 5 is an exemplary plot of a moving running average power consumed versus time according to an embodiment of the present invention.
Figure 6:
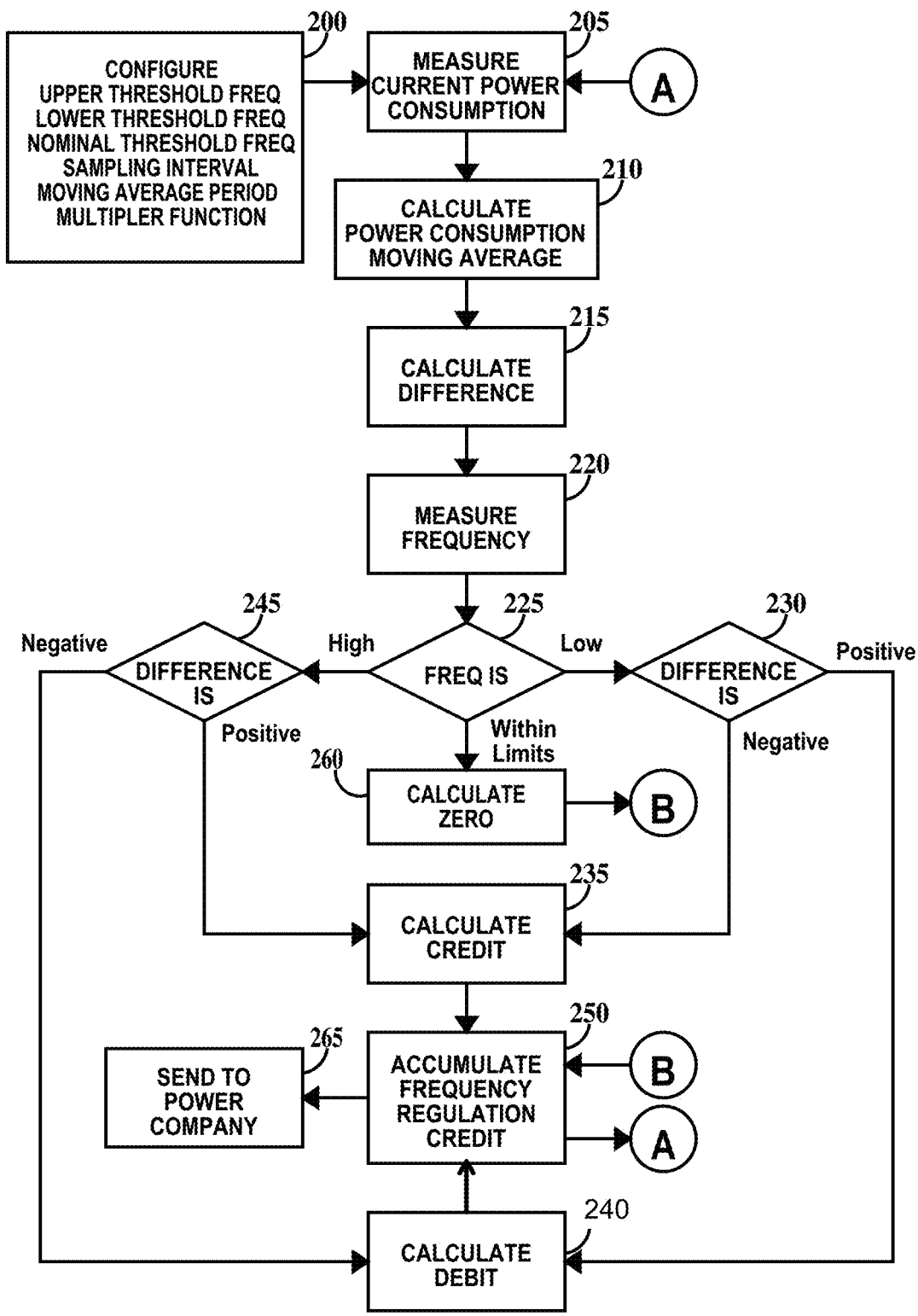
FIG. 6 is a flowchart of a method of frequency responsive load management according to an embodiment of the present invention.

Calculation unit 140 calculates debits and credits as described infra with respect to FIGS. 3, 4 and 5 and the method described by FIG. 6. Interface 145 may display the frequency regulation credit accumulated (the sum of credits and debits as described infra) and the KW (kilowatt)-hours used. The frequency regulation credit may be positive, negative or zero. The frequency regulation credit and the KW-hours used may be transmitted to the power generation facility modems 150A, 150B or 155 for billing and/or record keeping purposes. Wireless modem 155 may be a short range device accessible by a portable reading device. Interface 145 may take the form of a data port into which a recording device may be plugged in order to download the frequency regulation credits/frequency regulation debits accumulated (or the sum of frequency regulation credits and frequency regulation debits) and the KW-hours used by a human meter reader. Frequency meter 130 and watt-hour meters 135A and 135B may include digital or analog displays of the AC line frequency and KW-hours respectively. The KW-hours displayed may show the current rate of power usage, total power used or both the current rate of power usage and total power used.

FIGS. 3, 4 and 5 are an aid in understanding how the frequency regulation credit is calculated. The overall time period and scale of the time axis depicted in each of FIGS. 3, 4, and 5 is the same. The overall time period is divided into five distinct time ranges A, B, C, D and E. For the purposes of an example frequency regulation credit calculation, in FIGS. 3, 4 and 5, the sampling interval (SI) is 1/second, but in general is configurable and may be set as required.

FIG. 3 is an exemplary plot of AC line frequency versus time measured by a line monitoring device according to an embodiment of the present invention. In FIG. 3, a curve 160 represents AC line frequency in Hz on the incoming power line versus time in seconds. Line 170 indicates the nominal frequency of the power grid (e.g., 60.00 Hz). Line 175A is an upper threshold frequency (for example set a 60.02 Hz) and line 175B is a lower threshold frequency (for example set a 59.98 Hz). The upper threshold frequency is always more positive than the nominal frequency and the nominal frequency is always more positive than the lower threshold frequency. Debits and credits are calculated only for those time periods when the measured AC line frequency is greater than or equal to the upper threshold frequency or less than or equal to the lower threshold frequency. At a time T1 the frequency has a measured value of F1 Hz. At time T2, the frequency has a measured value of F2 Hz. At a time T3 the frequency has a measured value of F3 Hz. At a time T4 the frequency has a measured value of F4 Hz.

In time range A, the measured frequency is between the upper and lower threshold frequencies so no debits or credits will result. In time range B, the measured frequency is below the lower threshold frequency so debits or credits may result. Note, both debits and credits can be generated when the measured frequency is below the lower threshold frequency depending upon the customer's power usage before and during time period B. In time range C, the measured frequency is again between the upper and lower threshold frequencies no debits or credits will result. In time range D, the measured frequency is above the upper threshold frequency so debits and credits may result. Note, both debits and credits can be generated when the measured frequency is above the upper threshold frequency depending upon the customer's power usage before and during time period D. In time range E, the measured frequency is once again within the upper and lower threshold frequencies so debits and credits will not result.

In FIG. 4, a curve 180 is an exemplary plot of power consumption in watt-hours versus time in seconds. Each point on curve 180 is the amount of power consumed in a sampling interval of c second (i.e., the integral of dP/dt from 0 to c where P is watts and t is time in seconds). In the present example c is equal to one second. At a time T1 the power consumed has a measured value of P1 Hz. At time T2, the power consumed has a measured value of P2 Hz. At a time T3 the power consumed has a measured value of P3 Hz. At a time T4 the power consumed has a measured value of P4 Hz.

In FIG. 5, a curve 185 is an exemplary plot of the moving average of power consumption in watt-hours for a given sampling period versus time in seconds. Continuing the present example, a moving average power consumption period (MAVP) is set to 15 minutes though in general it is configurable and may set as required. Thus, each moving average data point is the average of the last 900 (15 minutes×60 seconds/minute×1 sample/second) power consumption points of FIG. 4. At a time T1 the moving average of power consumed has a measured value of M1 Hz. At time T2, the moving average of power consumed has a measured value of M2 Hz. At a time T3 the moving average of power consumed has a measured value of M3 Hz. At a time T4 the moving average of power consumed has a measured value of M4 Hz.

In the following discussion, it should be kept in mind that increasing load decreases AC line frequency and decreasing load, increases AC line frequency. At time T1, AC line frequency is below the lower frequency limit (see FIG. 3). The power consumed at T1 (see FIG. 4) is less than the moving average power at T1 (see FIG. 5) so power consumption is decreasing. A credit will result because customer power usage when compared to the power consumption moving average is driving the AC line frequency toward nominal. At time T2, AC line frequency is below the lower frequency limit (see FIG. 3). The power consumed at T2 (see FIG. 4) is greater than the moving average power at T2 (see FIG. 5) so power consumption is increasing. A debit will result because customer power usage when compared to the power consumption moving average is driving the AC line frequency away from nominal. At time T3, AC line frequency is above the upper frequency limit (see FIG. 3). The power consumed at T3 (see FIG. 4) is greater than the moving average power at T3 (see FIG. 5) so power consumption is increasing. A credit will result because customer power usage when compared to the power consumption moving average is driving the AC line frequency toward nominal. At time T4, AC line frequency is above the upper frequency limit (see FIG. 3). The power consumed at T4 (see FIG. 4) is less than the moving average power at T4 (see FIG. 5) so power consumption is decreasing. A debit will result because customer power usage when compared to the power consumption moving average is driving the AC line frequency away from nominal.

Assuming credits are positive and debits are negative the following formula will result in a the proper sign of a frequency regulation credit when summed for all sample intervals:

$$FRC = SF\Sigma[(P-M)(MF)] \quad (1)$$

where:
FRC is the frequency regulation credit;
P is the power consumed in a sampling interval;
M is the moving average of power consumed over N sampling intervals where N is a whole positive integer equal to or greater than 2 (the power consumption moving average);
MF is a multiplier function; and
SF is an optional scaling factor so the FRC is not an unreasonably large or small number in terms of output or display.

In its simplest implementation MF is one (1) when the AC line frequency is less than or equal to the lower the lower threshold frequency, one (1) when the AC line frequency is equal to or greater then the upper threshold frequency, and zero (0) when the AC line frequency is between the lower and upper threshold frequencies. The term (P−M) results in the in the proper signage for FRC (negative for debits, positive for credits).

MF may be adjusted to reward or penalize the consumer more when the frequency is low than when the frequency is high. For example, MF is five (5) when the AC line frequency is less than or equal to the lower the lower threshold frequency, one (1) when the AC line frequency is equal to or greater then the upper threshold frequency, and zero (0) when the AC line frequency is between the lower and upper threshold frequencies.

MF may be adjusted to provide a sliding scale that increases the absolute value of credits and debits the further away from nominal the measured frequency is. This is illustrated in Table I where 60.00 Hz is the nominal frequency, 60.02 is the upper threshold frequency and 59.98 is the lower threshold frequency. Two options are shown, the first (MF1) provides the same MP for the same absolute deviation from nominal above the upper threshold frequency or below the lower threshold frequency. The second (MF2) provides higher MPs for periods when the AC line frequency is below the lower frequency threshold than when the AC line frequency is above the upper threshold limit. Measured frequencies are rounded up or down.

TABLE I

| FREQUENCY | MP | |
|---|---|---|
| | MF1 | MF2 |
| 60.05 Hz | 3 | 3 |
| 60.04 Hz | 2 | 2 |
| 60.03 Hz | 1 | 1 |
| 60.02 Hz | 0 | 0 |
| 60.00 Hz | 0 | 0 |
| 59.98 Hz | 0 | 0 |
| 59.97 Hz | 1 | 2 |
| 59.96 Hz | 2 | 4 |
| 59.95 Hz | 3 | 6 |

MF may be expressed as a function of x (i.e., MF=f(x)). In one example MF may be expressed as:

$$MF = |CF - NF| \quad (2)$$

where:

CF is the measured AC line frequency in a particular sample interval; and

NF is the nominal AC line frequency.

In equation (2), x is CF and NF is a constant. Note, f(x) may take on any number of mathematical functions. Further MF may be a function of two or more variables, for example, CF, day of the week, time of day, and combinations thereof.

FIG. 6 is a flowchart of a method of frequency responsive load management according to an embodiment of the present invention. In step 200, upper and lower threshold frequencies, the nominal AC frequency (NF) the sampling interval (SI), number of sampling intervals (N) in the moving average, scaling factor (SF), and multiplication factor (MF) are configured. Additionally, initial frequency and power measurements are made to build up an initial set of data (e.g., a moving average of N consecutive data points) step 215 can operate on. Also in step 200, a frequency regulation credit (FRC) is set to an initial value, for example zero. Then, in step 205, the current power consumption for a first/next period of time equal to the sampling interval is measured as described in reference to FIG. 3. The word "current" in the phrase "current power consumption" is used herein in the sense of "present time" not electrical flow. In step 210, for the same period of time as in step 205, the moving average power consumption of the previous N sampling intervals is calculated as described in reference to FIG. 4. In step 215 the difference between the power consumption measured in step 205 and the moving average power consumption calculated in step 210 is calculated (i.e., (P−M)). In step 220, a current AC frequency on the AC power line during the same period of time as in step 205 is measured as described in reference to FIG. 3. The word "current" in the phrase "current AC frequency" is used herein in the sense of "present time" not electrical flow.

In step 225, it is determined if the measured AC frequency is equal to or less than the lower threshold frequency. If the measured AC frequency is equal to or lower than the lower frequency limit than the method proceeds to step 230. In step 230, it is determined if the difference calculated in step 215 is negative or positive. If the difference is negative, then the method proceeds to step 235 where a credit is calculated. If the difference is positive, then the method proceeds to step 240 where a debit is calculated.

Returning to step 225, if the measured AC frequency is equal to or higher than the lower frequency limit than the method proceeds to step 245. In step 255, it is determined if the difference calculated in step 215 is negative or positive. If the difference is positive, then the method proceeds to step 235 where a credit is calculated. If the difference is negative, then the method proceeds to step 240 where a debit is calculated.

After either steps 235 or 240, the method proceeds to step 250 where the frequency regulation credit is accumulated by adding a credit from step 235 or subtracting a debit from step 240 to the previous value of the frequency regulation credit. The frequency regulation credit is stored until required by step 265. Optionally, the debits and credits may be stored. After step 250 the method loops back to step 205 via connector A.

Again, returning to step 225, if the measured AC frequency is between the lower and upper threshold frequencies the method proceeds to step 260 where a zero credit/debit is calculated (the frequency regulation credit will be unchanged) and the method proceeds to step 250 vias connector B. Steps 225, 230, 235, 240, 245, and 260 can be performed simultaneously by evaluation of equation (1) when MF can evaluate to zero when the AC frequency measured in step 220 is between the upper and lower threshold frequencies. Alternatively, if MF cannot evaluate to zero, in step 225, when the AC frequency measured in step 220 is between the upper and lower threshold frequencies the method could loop directly back to step 205.

From step 240, step 265 is periodically (as in a billing cycle) performed. In step 260, the frequency regulation credit is sent to the power company and the frequency regulation credit reset to zero. Optionally the measurements and calculations of steps 205, 210, 215, 220 235, 240 and 250 may be displayed on a readout device or computer screen or printed on a printer. Optionally the measurements and calculations of steps 205, 210, 215, 220 235, 240 and 250 may be stored for future analysis.

The amount of time to perform a loop consisting of combinations of steps 205, 210, 215, 220, 225, 230, 235, 240, 245, 250 and 255 that takes the longest to perform should be less than or equal to the sampling interval. Steps 230 and 250 assume power consumption measured in step 205 is subtracted from the moving average power consumption calculated in step 215. If the opposite is performed, the in steps 230 and 250, the positive and negative loops would be reversed.

Figure 7:
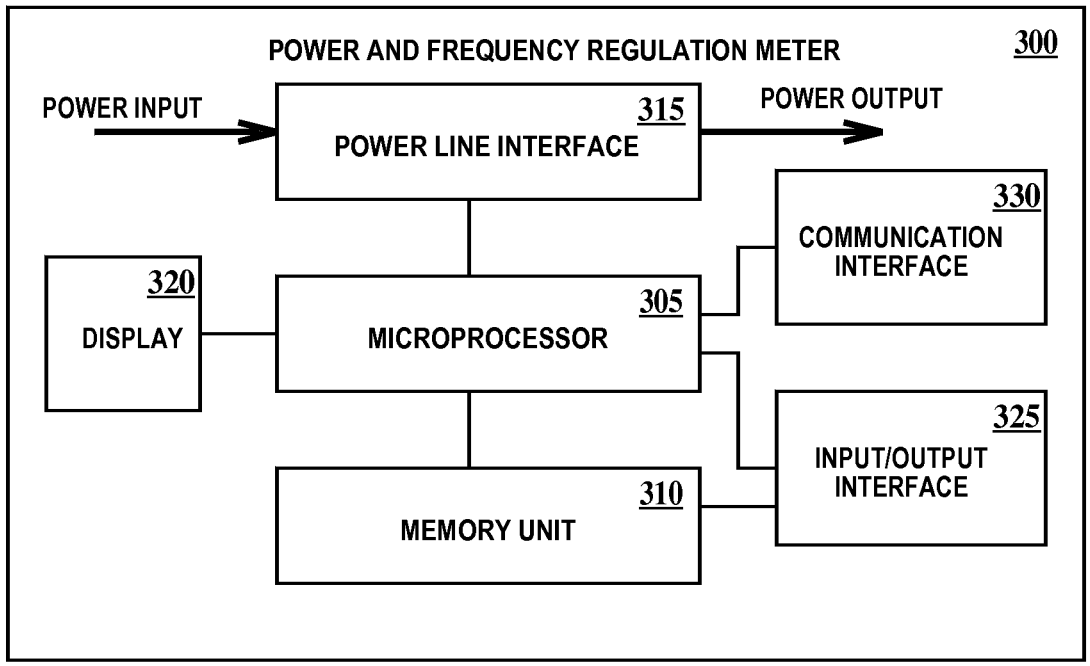
FIG. 7 is block diagram of an exemplary line monitoring device implemented as a power and frequency regulation meter according to an embodiment of the present invention.

FIG. 7 is block diagram of an exemplary line monitoring device implemented as a power and frequency regulation meter according to an embodiment of the present invention. In FIG. 7, a power and frequency regulation meter 300 includes a microprocessor 305, a memory unit 310, a power line interface 315, an optional display 320, an optional input/output interface 325 and a communication interface 330. Memory unit 310, power line interface 315, display 320, input/output interface 325 and communication interface 330 are all connected to microprocessor 305. Input/output interface 324 is optionally connected to memory unit 310. In use, a power from an AC power line (not shown) is connected to a power input of power line interface 315 and a load (not shown) is connected to a power output of power line interface 315. Power line interface 315 supplies power for microprocessor 305, memory unit 310, display 320, input/output interface 325 and communication interface 330. Microprocessor 305 calculates customer frequency regulation debits and frequency regulation credits as described infra with respect to FIGS. 3, 4 and 5 and the method described by FIG. 6. The algorithm that microprocessor performs is stored as instructions in memory unit 310. Memory unit 310 also stores data needed by and generated by the microprocessor executing the instructions, including power consumption measurements, power consumption moving averages and frequency regulation credits. Frequency regulation credits as well as total power consumption may be displayed by display 320. Input/output device 325 may be used to input the algorithm instructions and output frequency regulation credits as well as total power consumption. Communications interface 325 may be used to receive the algorithm instructions from the power supplier and send frequency regulation credits as well as total power consumption data to the power supplier.

Figure 8:
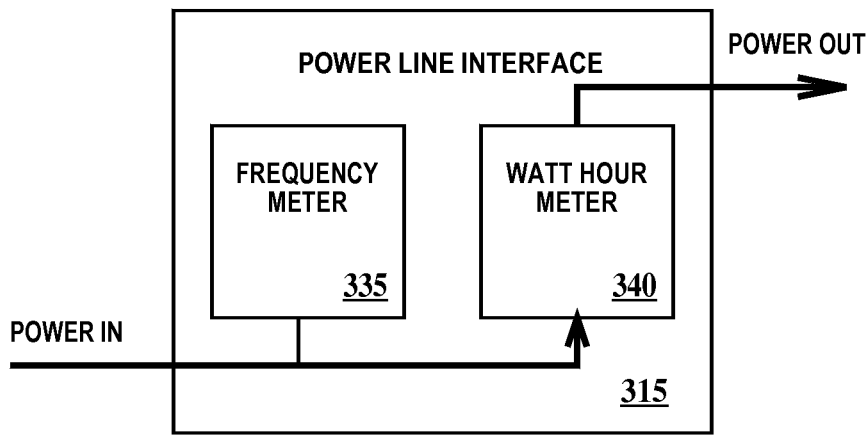
FIG. 8 is block diagram of the power line interface of FIG. 7.

FIG. 8 is block diagram of the power line interface of FIG. 7. In FIG. 8, power line interface includes a power frequency meter 335 (similar to power frequency meter 130 of FIG. 2 and a watt-hour meter 340 similar to watt-hour meters 135A and 135B of FIG. 2. Solid-state AC frequency meters are well known as are solid-state and electromechanical induction AC watt meters. In an alternative embodiment, frequency meter 335 and watt-hour meter 340 may be combined into a single solid-state device.

Figure 9:
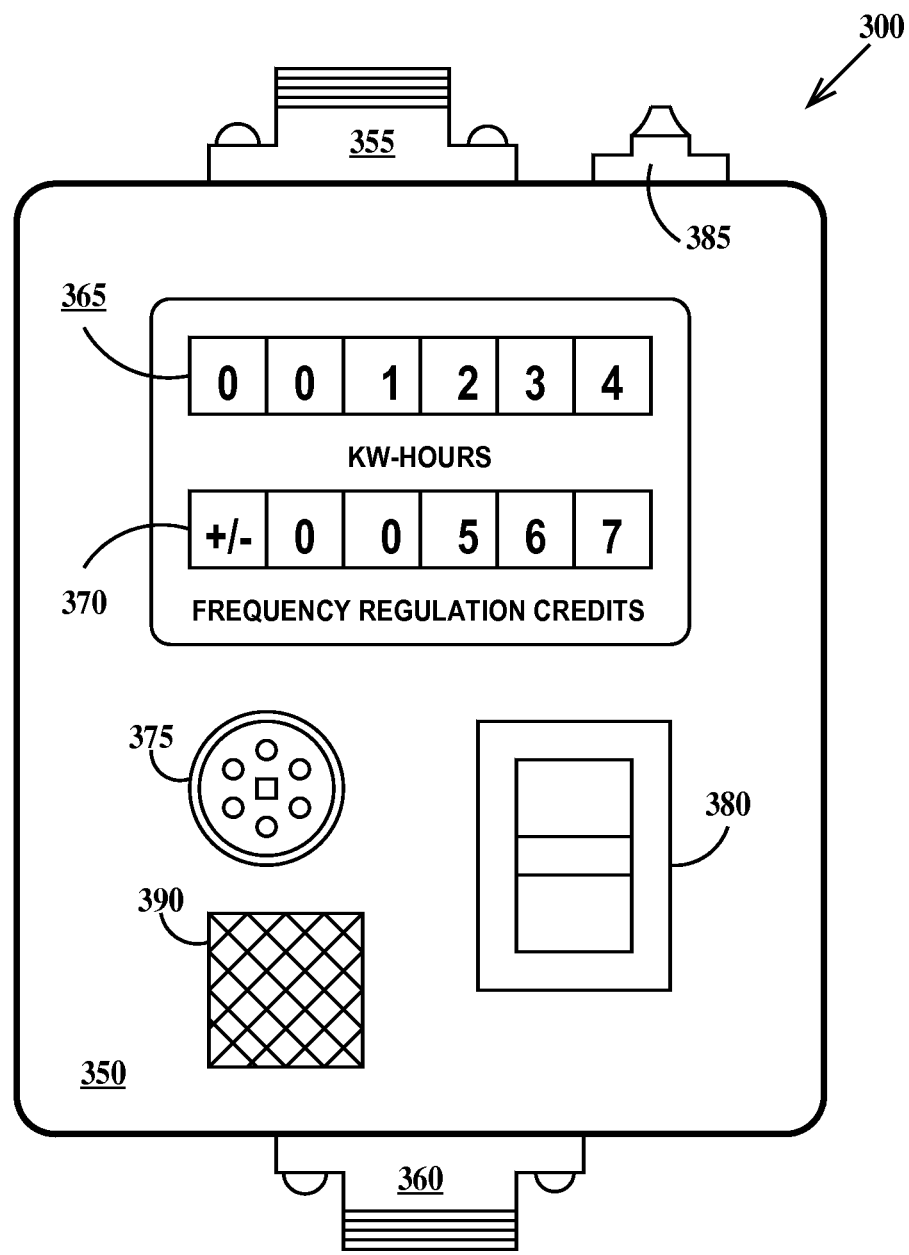
FIG. 9 is a mechanical drawing of an exemplary power meter according to an embodiment of the present invention.

FIG. 9 is a mechanical drawing of an exemplary power meter according to an embodiment of the present invention. Power and frequency regulation meter 300 may be physically packaged as illustrated in FIG. 9. In FIG. 9 a case 350 includes the electronics for microprocessor 305, memory unit 310, display 320, input/output interface 325 and communication interface 330 of FIG. 7. On a top of case 350 is a power input fitting 355 configured to connect a wire(s) from an AC power line and on a bottom of case 360 is a power output fitting 355 configured to connect a wire(s) to an external load at a customer residence or commercial or private establishment or business. In the front of case 350 is a KW-hour display 365 of an internal power meter which may be mechanical or electronic, a frequency regulation display 370 which may be mechanical or electronic, a data communication socket 375, an optional power disconnect (on the output side) switch 380. Also on top of case 350 is a telephone/cable fitting 385 configured to connect power and frequency regulation meter 300 to a telephone line or non-telephone cable communication system. Additionally an optional wireless communication device 390 may be included. In alternative embodiments, the physical components may be located in other physical relationships relative to case 350 different from that illustrated in FIG. 9.

While power and frequency regulation meter 300 of FIGS. 7 and 9 is well-suited for small power users, large power users would benefit from the line monitoring device 115 of FIG. 1 being implemented using a general purpose computer where the method described herein with respect to frequency responsive load management using frequency regulation credits described supra in FIGS. 3, 4 and 5 and the flowchart of FIG. 6 with respect to steps 200, 210, 215, 225, 230, 235, 240, 345 and 250 may be coded as a set of instructions on removable or hard media for use by the general-purpose computer.

Figure 10:
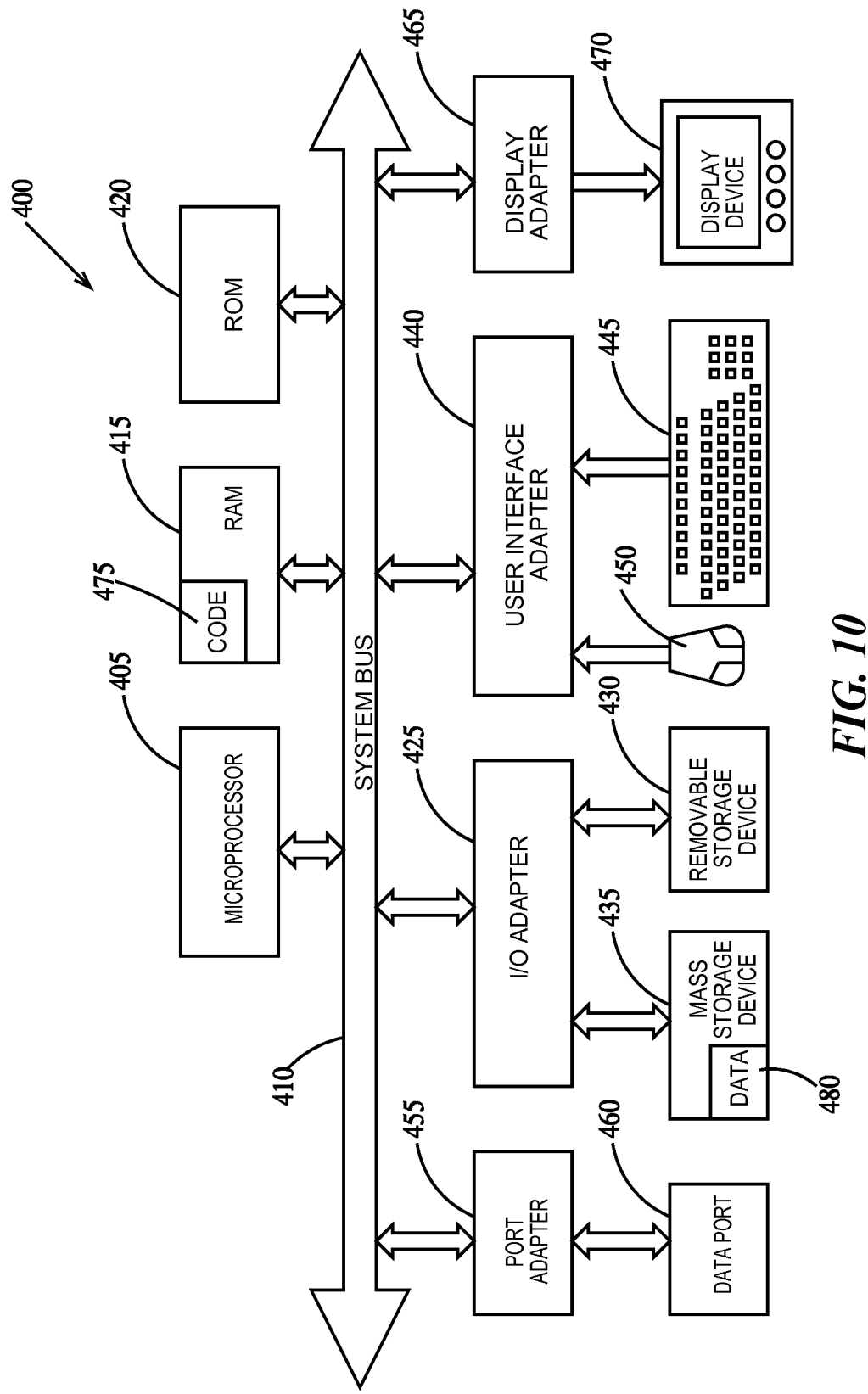
FIG. 10 is block diagram of a general-purpose computer.

FIG. 10 is block diagram of an exemplary general-purpose computer. In FIG. 10, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include electronic, magnetic, optical, electromagnetic, infrared, and semiconductor devices. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

Data from power line interface 315 of FIG. 8 in the form of watt-hour and AC line frequency measurements are supplied to the system via data port 460. Also frequency regulation credits as well as total power consumption may be transmitted to the power company via devices connected to data port 460 and program instructions may be received from the power company via data port 460. Computer 400 may also be used to perform complex power/cost analysis and used to direct power consumption reducing or power consumption increasing measures such as increasing or reducing throughputs and/or turning equipment on or off when debits are being generated.

A computer program with an appropriate application interface may be created by one of skill in the art and stored on the system or a data and/or program storage device to simplify the practicing of this invention. In operation, information for or the computer program created to run the method of the present invention is loaded on the appropriate removable data and/or program storage device 430, fed through data port 460 or typed in using keyboard 445.

Thus the embodiments of the present invention prove a method, device and system for frequency responsive load management using frequency regulation credits.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A power and frequency regulation meter to which AC power is supplied from an AC power supplier through an AC power line, said power and frequency regulation meter comprising:
a case;
an AC frequency meter that receives AC power from the AC power line;
an AC power consumption meter that receives AC power from the AC power line;
an AC power consumption display that receives AC power from the AC power line and displays power consumption;
a frequency regulation credits display that displays a frequency regulation credit;
a processor to which the AC frequency meter, the AC power consumption meter, AC power consumption display, and frequency regulation credits display are coupled;
a memory device coupled to the processor; and
a communication device coupled to the processor,
wherein the case encases the AC frequency meter, the AC power consumption meter, the AC power consumption display, the frequency regulation credits display, the processor, the memory, and the communication device,
wherein the AC frequency meter measures a current AC frequency on the AC power line;
wherein the AC power consumption meter measures a current power consumption on the AC power line over a period of time equal to a first sampling interval;

wherein the processor is configured to calculate a power consumption moving average of a last N power current power consumptions measured by the AC power consumption meter such that N is a positive integer greater than 1;

wherein the processor is configured to generate credits or debits based on the current power consumption, the current AC frequency and the power consumption moving average;

wherein the processor is configured to add the credits or debits to a frequency regulation credit and store the credits, debits, or credits and debits on the memory device;

for each next sampling interval of multiple sampling intervals, the power and frequency regulation meter is configured to repeat measuring the current AC frequency, measuring the current power consumption, calculating the power consumption moving average, generating the credit or debit, adding the credits or debits to the frequency regulation credit, and storing the frequency regulation credit or debit on the memory device;

wherein a credit is generated when the current power consumption when compared to the power consumption moving average is driving the current AC frequency of the AC power line toward a nominal AC frequency of the AC power line;

wherein a debit is generated when the current power consumption when compared to the power consumption moving average is driving the current AC frequency of the AC power line away from the nominal AC frequency of the AC power line;

wherein the generation of the credit or debit includes:
generation of a debit in response to a first condition in which the current AC frequency is greater than or equal to an upper threshold frequency and the current power consumption is less than the power consumption moving average, wherein the first condition drives the current AC frequency of the AC power line away from the nominal AC frequency of the AC power line;
generation of a credit in response to a second condition in which the current AC frequency is greater than or equal to the upper threshold frequency and the current power consumption is greater than the power consumption moving average, wherein the second condition drives the current AC frequency of the AC power line toward the nominal AC frequency of the AC power line;
generation of a debit in response to a third condition in which the current AC frequency is less than or equal to a lower threshold frequency and the current power consumption is greater than the power consumption moving average, wherein the third condition drives the current AC frequency of thew AC power line away from the nominal AC frequency of the AC power line;
generation of a credit in response to a fourth condition in which the current AC frequency is less than or equal to the lower threshold frequency and the current power consumption is less than the power consumption moving average, wherein the fourth condition drives the current AC frequency of the AC power line toward the nominal AC frequency of the AC power line;

wherein a credit or a debit is not generated when the current AC frequency is between the upper threshold frequency and the lower threshold frequency;

wherein the power consumption is dynamically and simultaneously displayed via the AC power consumption display and the frequency regulation credit is dynamically and simultaneously displayed via the frequency regulation credits display;

wherein the displayed frequency regulation credit is a cumulative net credit or debit;

wherein the first sampling interval and the multiple sampling intervals collectively includes a time T1 at which the fourth condition prevails with a first credit being generated, a time T2 at which the third condition prevails with a first debit being generated, a time T3 at which the second condition prevails with a second credit being generated, and a time T4 at which the first condition prevails with a second debit being generated, subject to T1<T2<T3<T4;

wherein after the time T2 at which the first debit is generated and before the time T3, the current AC frequency of the AC power line engages in a first movement toward the nominal AC frequency of the AC power line;

wherein after the time T4 at which the second debit is generated, the current AC frequency of the AC power line engages in a second movement toward said nominal AC frequency of the AC power line;

wherein the first movement and the second movement of the current AC frequency of the AC power toward the nominal AC frequency of the AC power line increases an efficiency of running the AC power grid comprising the AC power line; and wherein the communication device is configured to transmit a frequency regulation credit from the power and frequency regulation meter to the AC power supplier.

2. The power and frequency regulation meter of claim 1, wherein the processor is configured to initialize a power consumption moving average of N consecutive power consumption measurements, each power consumption measurement made over a respective period of time equal to said sampling interval; and
wherein after the frequency regulation credit is transmitted to the AC power supplier, the processor is configured to reset the frequency regulation credit to zero.

3. The power and frequency regulation meter of claim 1, wherein the processor is configured to periodically transfer the frequency regulation credit to a power company supplying AC power on the AC power line.

4. The power and frequency regulation meter of claim 1, wherein the processor is configured to calculate the frequency regulation credit by using the algorithm:

$$FRC = SF\Sigma[(P-M)(MF)]$$

where:
FRC is the frequency regulation credit;
P is the power consumed in a sampling interval;
M is the moving average of power consumed over N sampling intervals where N is a whole positive integer equal to or greater than 2 (the power consumption moving average);
MF is a multiplier function; and
SF is a scaling factor.

5. The power and frequency regulation meter of claim 1, wherein said frequency regulation credit is transmitted to the AC power supplier through the internet, a cable line or a telephone line.

6. The power and frequency regulation meter of claim 1,
after the AC power supplier receives the frequency regulation credits, debits or credits and debits, the AC power supplier applies the frequency regulation credits, debits or credits and debits to an AC power bill for a customer site the comprises the power and frequency regulation meter; and wherein the AC power supplier bills the customer site.

7. The power and frequency regulation meter of claim 1,
wherein the processor is configured to calculate a difference between the current power consumption and the power consumption moving average; and wherein the processor is configured to dynamically display the current AC frequency, the difference between the current power consumption and the power consumption moving average, and the credits, debits or credits and debits.

\* \* \* \* \*